(No Model.)
E. CARROLL & T. B. LAMBERT.
JOINT FOR ELECTRIC CONDUCTORS.
No. 452,516. Patented May 19, 1891.
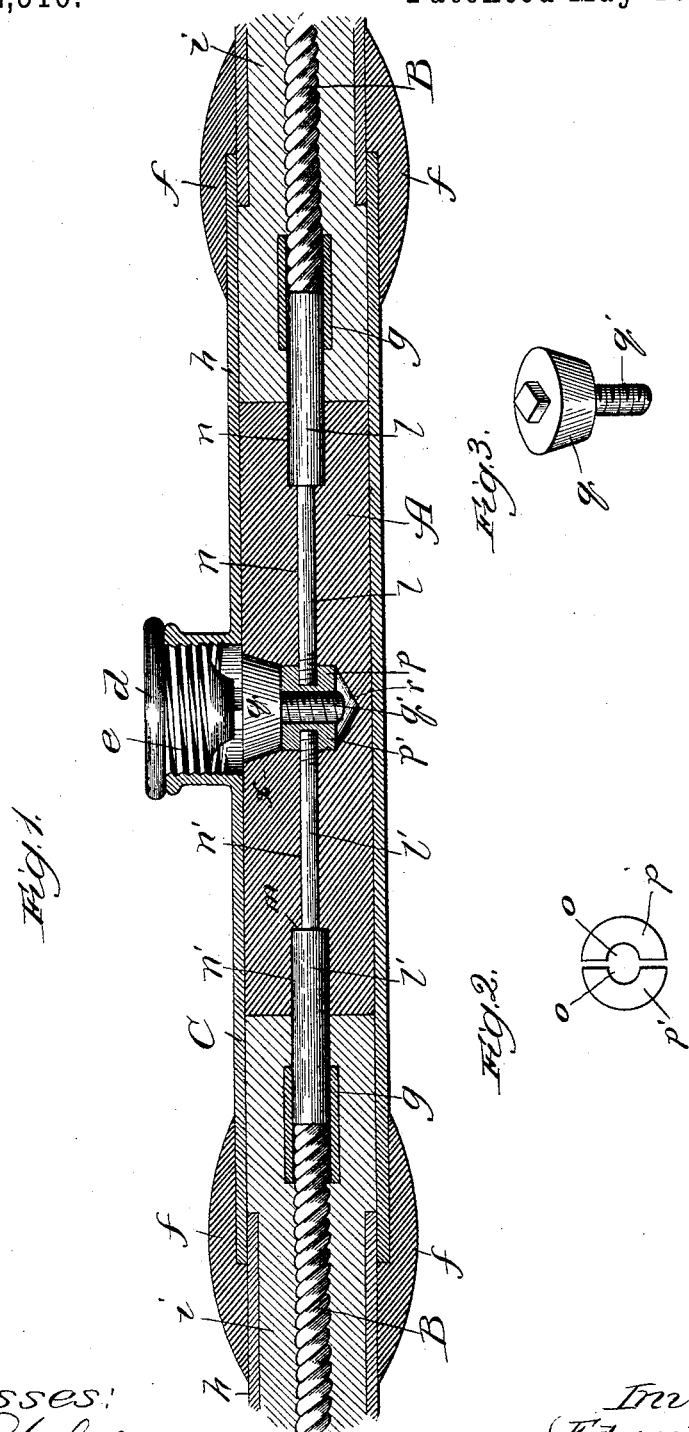
Witnesses:
Chas. C. Gaylord.
Clifford N. White.
Inventors:
Edward Carroll.
Thomas B. Lambert.
By Dyrenforth and Dyrenforth,
Attys.
THE NORRIS PETERS CO., PHOTO-LITHO., WASHINGTON, D. C.

UNITED STATES PATENT OFFICE.

EDWARD CARROLL AND THOMAS B. LAMBERT, OF CHICAGO, ILLINOIS.

JOINT FOR ELECTRIC CONDUCTORS.

SPECIFICATION forming part of Letters Patent No. 452,516, dated May 19, 1891.

Application filed November 18, 1890. Serial No. 371,780. (No model.)

*To all whom it may concern:*

Be it known that we, EDWARD CARROLL and THOMAS B. LAMBERT, citizens of the United States, residing at Chicago, in the county of Cook and State of Illinois, have invented a new and useful Improvement in Joints for Electric Conductors, of which the following is a specification.

Our invention relates to an improved construction of joint for connecting the ends of insulated electric wires or cables, whether the insulation be inclosed in metal or not, and though our improvement is not restricted to use in any particular situation of electric conducting-wires we have especially designed it for application to underground systems in connecting the conductors within the manholes and other points provided for convenience of access to the conductors for testing and other purposes.

The primary object of our improvement is to provide an effective and reliable construction of joint which when once applied will permit ready access to the conductor, the severed ends of which it serves to hold for testing purposes without requiring the joint structure to be impaired or even disturbed.

Our improved joint is illustrated in the accompanying drawings, in which—

Figure 1 is a longitudinal sectional view, and Figs. 2 and 3 are views in elevation of details.

A is a solid block, preferably, but not necessarily, of cylindrical form, and composed of insulating material, such as hard rubber. In one side of the block A is a chamber $r$, terminating near the longitudinal center of the block, and which may flare in an outward direction from near the entrance, as shown at $x$, to afford a seat for a tapering plug $q$, having a stem $q'$, preferably screw-threaded, as shown, and serving a purpose hereinafter described. In the chamber $r$, beneath the plug $q$, are two metallic (as brass or copper) heads $p$ and $p'$, which should conform to the shape in cross-section of the chamber containing them, and to that end are preferably of the semicircular shape illustrated in Fig. 2, each having a central semicircular recess $o$ in its straight side. Openings $n$ and $n'$ lead from opposite ends, near the longitudinal center of the block A, into the chamber $r$, and by preference widen toward their outer ends to form the offsets or shoulders $m$. In the openings $n$ and $n'$, respectively, fit conductors $l$ and $l'$, threaded at the ends of their reduced portions, as shown, where they enter the chamber $r$ and engage threaded openings formed radially in the contact-heads $p$ and $p'$. Thus, as will be seen, by properly turning the conductors $l$ and $l'$ the contact-heads are drawn and rigidly held against opposite sides of the wall of the chamber $r$.

B denotes the conductor, which is severed to permit the insertion of our improved joint, and is connected at its respective severed ends with the protruding ends of the conductors $l$ and $l'$, which thus form continuations of the conductor B and are practically integral with the latter. The conductor B illustrated is of the kind inclosed in an insulating substance $i$ (as hard-rubber tubing) incased in a metal (lead) shield $h$, and the connection between its severed ends and the protruding ends of the conductors $l$ and $l'$ is produced by means of metal (as copper) ferrules $g$, secured over them.

If the conductor B, connected with our improved joint, be of the kind not provided with the external metal covering $h$, the parts thus far described may form the joint, which would then be cemented from opposite ends of the block A to the insulation at the adjacent severed ends of the conductor B with a suitable insulating substance—such as Chatterton's compound—the connections being made by the form of the lead wipe-joints $f$. (Illustrated in Fig. 1.) The break in the conductor caused by the permanent separation of the confined terminal heads $p$ and $p'$ is filled by the stem $q'$, which is of a size to fit the opening between the heads formed by their recesses $o$, and thus electrically connect the separated ends of the conductor by producing contact between them, the extent of which contact is increased by the abutment of the plug $q$ against the flat upper sides of the heads.

Where the conductor B is covered with lead $h$ over the insulation $i$ we provide a metal (brass) shield C, which is slid back out of the way over one end of the conductor B while the joint is being secured in place, and then moved into place to bring the opening $e$ in its side coincident with the plug $q$, when it is secured in place by the wipe-joints $f$ fastening it to the metal $h$, and the opening $e$ is normally closed by a suitable cover or plug $d$, which should be sufficiently long to bear, when adjusted in place, against the stopper $q$, and thus afford an additional safeguard against unintentional displacement of the latter, which would impair its contact with the heads $p$ and $p'$. As will thus be seen, to gain access to the conductor for testing purposes, it is only necessary (after removing the plug $d$, if a shield C be employed) to remove the plug $q$, thereby breaking the contact and enabling the plug of the testing-instrument to be readily inserted in its place, and after the test the parts may be again readily adjusted, the desired operation having been performed without inconvenience and without requiring impairment of the joint structure.

Broadly considered, the block A forms an insulating-holder for the severed and permanently-separated ends of a conductor and for a removable contact piece or plug to produce electrical connection between them.

What we claim as new, and desire to secure by Letters Patent, is—

1. In an electric-conductor joint, the combination of a block A of insulating material, containing a chamber $r$, opening at a side of the block, contact-heads $p$ and $p'$ in the chamber, a contact removably inserted into the chamber between the said heads, and conductors $l$ and $l'$, entering the chamber from different sides of the block and engaging the contact-heads to maintain them apart, and to the outer ends of which the severed ends of the conductor are to be secured, substantially as described.

2. In an electric-conductor joint, the combination of a block A of insulating material, containing a chamber $r$, opening at a side of the block, contact-heads $p$ and $p'$ in the chamber, a plug $q$, having a stem $q'$, removably inserted into the chamber between the said heads, openings $n$ and $n'$, leading into the chamber from different sides of the block, and having offsets $m$, and conductors $l$ and $l'$ in the said openings, threaded at their inner ends and engaging at the threads with the heads in the chamber to maintain them rigid and apart and adapted to have connected with their outer ends the severed ends of the conductor B, substantially as described.

3. In an electric-conductor joint, the combination, with an insulated metal-covered conductor B, of a block A of insulating material, containing a chamber $r$, opening at a side of the block, contact-heads $p$ and $p'$ in the chamber, a contact removably inserted into the chamber between the said heads, conductors $l$ and $l'$, entering the chamber from different sides of the block and engaging the contact-heads to maintain them apart, and to the outer ends of which the severed ends of the conductor B are secured, and a metal shield C, having an opening $e$, provided with removable closing means and joined at opposite ends to the metal covering of the conductor B, substantially as described.

4. An electric-conductor joint comprising, in combination with an insulated metal-covered conductor B, a block A of insulating material, containing a chamber $r$, contact-heads $p$ and $p'$, having recesses $o$ in the chamber, a plug $q$, having a stem $q'$, removably inserted between the said heads, openings $n$ and $n'$, offsets $m$, leading into the chamber from different sides of the block A, conductors $l$ and $l'$, fitting the said openings and threaded at their inner ends to engage the heads $p$ and $p'$, and to the outer ends of which the severed ends of the conductor B are secured, and a shield C, enveloping the block and joined to the metal cover of the conductor B, and provided with an opening $e$, having a removable cover, substantially as described.

EDWARD CARROLL.
THOMAS B. LAMBERT.

In presence of—
J. W. DYRENFORTH,
M. J. FROST.